US010438276B2

United States Patent
Godsey et al.

(10) Patent No.: US 10,438,276 B2
(45) Date of Patent: Oct. 8, 2019

(54) SMART RECURRENT ORDERS

(71) Applicant: eBay Inc., San Jose, CA (US)

(72) Inventors: Sandra Lynn Godsey, San Jose, CA (US); David Beach, Santa Cruz, CA (US)

(73) Assignee: eBay Inc., San Jose, CA (US)

( * ) Notice: Subject to any disclaimer, the term of this patent is extended or adjusted under 35 U.S.C. 154(b) by 592 days.

(21) Appl. No.: 14/254,240

(22) Filed: Apr. 16, 2014

(65) Prior Publication Data

US 2015/0302510 A1  Oct. 22, 2015

(51) Int. Cl.
  *G06Q 30/00* (2012.01)
  *G06Q 30/06* (2012.01)
  *G06Q 10/08* (2012.01)

(52) U.S. Cl.
  CPC ....... *G06Q 30/0635* (2013.01); *G06Q 10/087* (2013.01)

(58) Field of Classification Search
  CPC .................................................... G06Q 30/00
  See application file for complete search history.

(56) References Cited

U.S. PATENT DOCUMENTS

| | | | | |
|---|---|---|---|---|
| 5,445,295 A * | 8/1995 | Brown | ............. | G07F 7/069 221/3 |
| 6,204,763 B1 * | 3/2001 | Sone | ............. | A47G 29/141 221/2 |
| 6,829,520 B1 * | 12/2004 | Green | ............. | G01K 3/04 235/385 |
| 6,963,851 B1 * | 11/2005 | Szabo | ............. | G06Q 30/02 186/56 |
| 7,065,501 B1 * | 6/2006 | Brown | ............. | G06Q 10/087 705/22 |
| 8,170,927 B2 * | 5/2012 | Godlewski | ............. | G06Q 10/087 700/216 |
| 8,537,398 B2 * | 9/2013 | Burke, Jr. | ............. | G06Q 10/087 358/1.15 |
| 9,123,082 B2 * | 9/2015 | Hu | ............. | G06Q 50/06 |
| 9,818,079 B2 * | 11/2017 | Ginster, II | ............. | G06Q 10/087 |
| 2001/0034636 A1 * | 10/2001 | Ikemura | ............. | G06Q 10/087 705/28 |
| 2001/0037259 A1 * | 11/2001 | Sharma | ............. | G06Q 10/08 705/23 |
| 2002/0015020 A1 * | 2/2002 | Mobin | ............. | G06F 1/1601 345/156 |
| 2002/0073148 A1 * | 6/2002 | Haines | ............. | G06Q 10/087 709/204 |
| 2005/0074246 A1 * | 4/2005 | Hayward | ............. | G06Q 30/02 399/8 |

(Continued)

OTHER PUBLICATIONS

Guen et al, "A Comprehensive Guide to Retail out-of-stock reduction in the fast-moving consumer goods industry", I.E. Business School Madrid, dated Circa 2008. (Year: 2008).*

*Primary Examiner* — Mark A Fadok
(74) *Attorney, Agent, or Firm* — Schwegman Lundberg & Woessner, P.A.

(57) ABSTRACT

In various example embodiments, a system and method for smart recurrent orders are presented. An inventory indicator corresponding to an inventory level of a first item may be received. An order schedule for the first item may be identified. An adjustment to the order schedule based on the inventory indicator may be determined. The adjustment to the order schedule for the first item may be facilitated.

16 Claims, 11 Drawing Sheets

(56) References Cited

U.S. PATENT DOCUMENTS

| | | | | |
|---|---|---|---|---|
| 2005/0075954 | A1* | 4/2005 | Matsumoto | G06Q 10/087 705/28 |
| 2005/0114235 | A1* | 5/2005 | Snyder | G06Q 10/087 705/28 |
| 2005/0182696 | A1* | 8/2005 | Shatzkin | G06Q 20/203 705/28 |
| 2008/0015958 | A1* | 1/2008 | Vanker | G06Q 10/087 705/28 |
| 2008/0162278 | A1* | 7/2008 | Hershkovitz | G06Q 30/0269 705/14.66 |
| 2009/0106125 | A1* | 4/2009 | Rock, Jr. | G06Q 10/087 705/26.1 |
| 2009/0326829 | A1* | 12/2009 | Liamos | G06F 19/3456 702/19 |
| 2010/0082458 | A1* | 4/2010 | Godlewski | G06Q 30/0635 705/28 |
| 2010/0123436 | A1* | 5/2010 | Herrod | H02J 7/0052 320/132 |
| 2011/0054984 | A1* | 3/2011 | Bateni | G06Q 10/087 705/7.31 |
| 2011/0192902 | A1* | 8/2011 | Kreiner | G06Q 10/08 235/385 |
| 2012/0136741 | A1* | 5/2012 | Agarwal | G06Q 10/00 705/26.1 |
| 2012/0160915 | A1* | 6/2012 | Kreiner | G06Q 10/08 235/385 |
| 2012/0239494 | A1* | 9/2012 | Hu | G06Q 30/0207 705/14.49 |
| 2012/0278454 | A1* | 11/2012 | Stewart | H04L 67/34 709/220 |
| 2012/0296796 | A1* | 11/2012 | Smith | G06Q 40/025 705/37 |
| 2013/0013371 | A1* | 1/2013 | Katsakhyan | G06Q 30/02 705/7.29 |
| 2013/0173330 | A1* | 7/2013 | Puskorius | G06Q 10/06315 705/7.25 |
| 2013/0218511 | A1* | 8/2013 | Mager | G01G 23/3735 702/129 |
| 2014/0006329 | A1* | 1/2014 | Hu | G06Q 50/06 706/46 |
| 2015/0186836 | A1* | 7/2015 | Chouhan | G06Q 10/087 705/28 |

* cited by examiner

SMART RECURRENT ORDERS

TECHNICAL FIELD

Embodiments of the present disclosure relate generally to online commerce, and more particularly, but not by way of limitation, to smart recurrent orders.

BACKGROUND

Modern consumers purchase a wide spectrum of consumable products including everything from motor oil to baby wipes. Tracking such a variety of consumable products can be difficult and can often cause inconveniences due to mismanagement of supply. Subscriptions to order products at a specified rate can leave consumers with too few or too many. Variable rates of usage may further compound inaccuracies of subscription.

BRIEF DESCRIPTION OF THE DRAWINGS

Various ones of the appended drawings merely illustrate example embodiments of the present disclosure and cannot be considered as limiting its scope.

DETAILED DESCRIPTION

Figure 1:
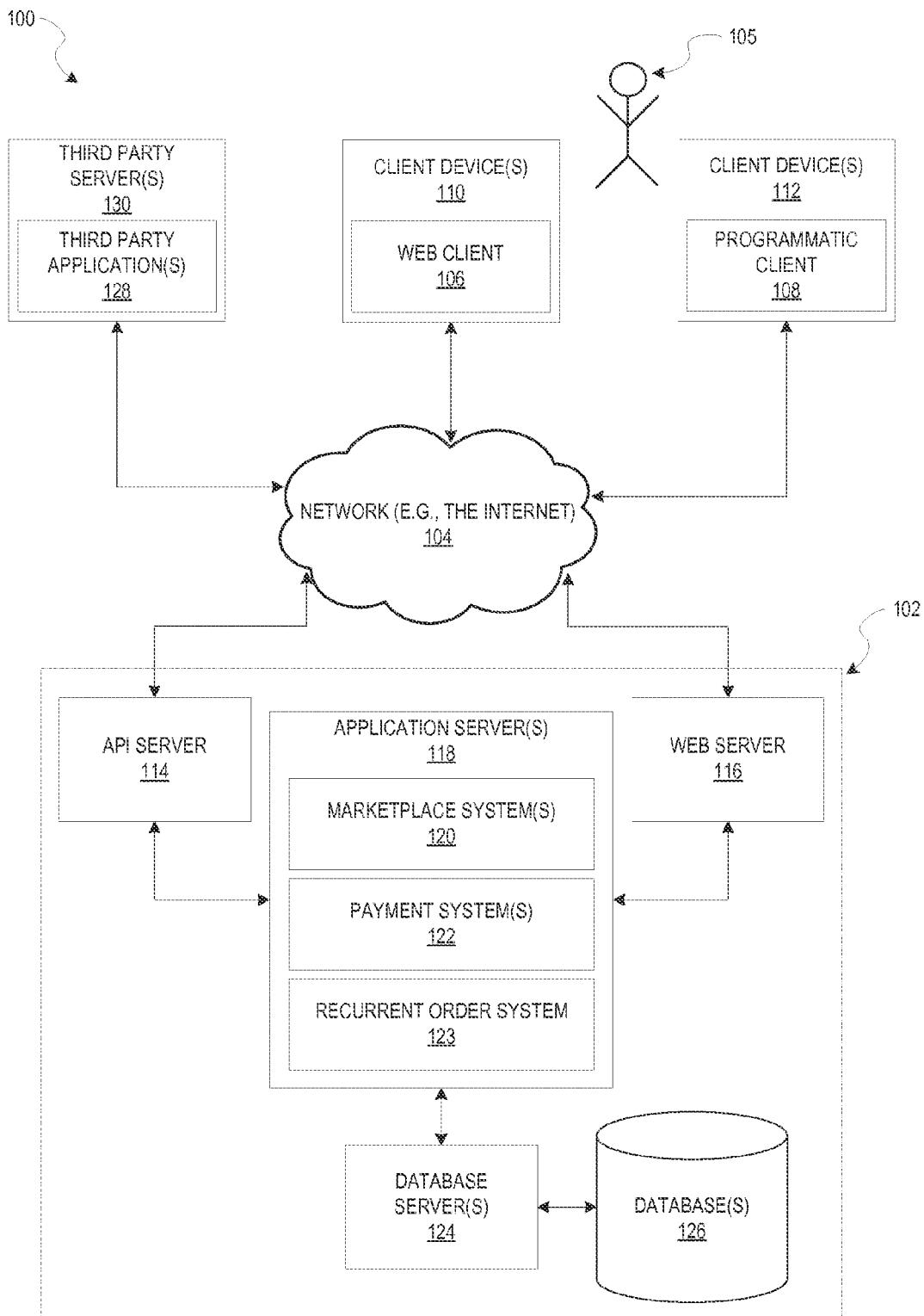
FIG. 1 is a block diagram of a networked system according to example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Described in detail herein are systems and methods for smart recurrent orders. The reordering of frequently used items (e.g., consumable items such as toiletries, baby items, coffee filters, motor oil, and so on) can be burdensome. To facilitate the ordering of such items, order parameters may be automatically determined to anticipate the user's future usage of the item.

In an example embodiment, an inventory indicator, indicating an inventory level of at least one item, is generated from information or signals received from a user device. The device may be a smart device, which is an electronic device, which may be part of a network or connected to other devices. The smart device may communicate via a variety of techniques, such as by wireless protocols, and may operate interactively or autonomously. The inventory indicator is based on smart device information or signals, and is used to indicate a condition or status of the device. A smart device may be a mobile device, such as a cell phone, laptop computer, a tablet computing device, a wearable technology device, or other device, wherein the device stores status or behavior information for a user that is related to an item or product. Smart devices may be stationary devices, or other modules, within a home, business, vehicle, and so forth. In a house may have one or more smart devices integrated throughout, referred to as a smart house, the smart devices may act as sensors to detect an inventory level of the item (e.g., a smart refrigerator that may determine the inventory level of items in the refrigerator), or may provide information that is used to determine a current inventory level or need for ordering an item or product. Such information may be related to the user's use of the item (also referred to as product). For example, the use of an electric toothbrush may indicate the need for toothpaste; or the use of a heating unit may indicate a need to replace an air filter. Other environments may use smart devices in a similar manner.

In some embodiments, the smart device information is implemented with other information about the user, product, or environment as feedback for the recurring ordering process.

A system accesses the smart device information, or receives information and signals, which are used to anticipate user inventory. Additionally, the system incorporates user data (a portion of which may be user specified), such as a purchase history of the user, a browse history of the user, various sensor data of the user, a user profile, and so on, for determining inventory needs. In some example embodiments, the item may be specified by the user, determined by identifying recurrently purchased items from the user data, or selected from a list of consumable items. For example, a user may schedule recurring orders for diapers; the system uses this information and adjusts the ordering according to usage of a diaper disposal system, or status of baby wipes. The system thereby provides a dynamic enhancement to a subscription cycle or schedule.

Order parameters (e.g., quantity, delivery time, delivery method, delivery destination, merchant, product, and so on) for a purchased of the item may be determined based on an analysis of the user data and inventory level. In further example embodiments, user data of a plurality of other users may be used to determine the order parameters. The analysis may determine order parameters predictive of the user's future usage of the item. The order parameters may be determined to satisfy other objectives, for example, the delivery time may be determined to avoid depletion of a supply of the item, the delivery location may be determined to be convenient for the user, the merchant and product may be determined to minimize average cost of the item, and so forth. In some embodiments, local purchase behavior is used to adjust the recurring order or subscription schedule, such as where orders for an item spike and the system will order the item ahead of schedule to avoid any discontinuity for the user. In this scenario, the system uses knowledge of the user's ordering demand and cadence to anticipate supply inconsistencies or disruptions.

The purchase of the item may be facilitated using the order parameters. In some example embodiments, a low inventory condition may be determined based on the inventory level and the purchase of the item may be performed automatically. In other example embodiments, the system may notify the user of the low inventory condition and recommend purchase of the item using the order parameters. Various user criteria may specify rules for the order parameters (e.g., the user may specify a price limit or a particular brand to purchase).

With reference to FIG. 1, an example embodiment of a high-level client-server-based network architecture 100 is shown. A networked system 102, in example forms of a network-based marketplace or payment system, provides server-side functionality via a network 104 (e.g., the Internet or wide area network (WAN)) to one or more client devices 110 and 112. FIG. 1 illustrates, for example, a web client 106 (e.g., a browser, such as the Internet Explorer® browser developed by Microsoft® Corporation of Redmond, Wash. State), and a programmatic client 108 executing on respective client devices 110 and 112.

The client devices 110 and 112 may comprise, but are not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may utilize to access the networked system 102. In some embodiments, the client device 110 may comprise a display module (not shown) to display information (e.g., in the form of user interfaces). In further embodiments, the client device 110 may comprise one or more of a touch screens, accelerometers, gyroscopes, cameras, microphones, global positioning system (GPS) devices, and so forth. The client devices 110 and 112 may be devices of a user that are used to perform a transaction involving digital goods within the networked system 102. In one embodiment, the networked system 102 is a network-based marketplace that responds to requests for product listings, publishes publications comprising item listings of products available on the network-based marketplace, and manages payments for these marketplace transactions.

One or more users 105 may be a person, a machine, or other means of interacting with client devices 110 and 112. In embodiments, the user 105 is not part of the network architecture 100, but may interact with the network architecture 100 via client devices 110 and 112 or another means.

An application program interface (API) server 114 and a web server 116 are coupled to, and provide programmatic and web interfaces respectively to, one or more application servers 118. The application servers 118 may host one or more marketplace system(s) 120, payment system(s) 122, and recurrent order system 123, each of which may comprise one or more modules or applications and each of which may be embodied as hardware, software, firmware, or any combination thereof. The application servers 118 are, in turn, shown to be coupled to one or more database servers 124 that facilitate access to one or more information storage repositories or database(s) 126. In an example embodiment, the databases 126 are storage devices that store information to be posted (e.g., publications or listings) to the marketplace system(s) 120. The databases 126 may also store digital goods information in accordance with example embodiments.

The marketplace system(s) 120 may provide a number of marketplace functions and services to users 105 that access the networked system 102. The payment system 122 may likewise provide a number of functions to perform or facilitate payments and transactions. While the marketplace system(s) 120 and payment system(s) 122 are shown in FIG. 1 to both form part of the networked system 102, it will be appreciated that, in alternative embodiments, each system 120 and 122 may form part of a payment service that is separate and distinct from the networked system 102. In some embodiments, the payment system(s) 122 may form part of the marketplace system(s) 120.

The recurrent order system 123 may provide functionality operable to determine order parameters for the purchase of the item in response to receiving the inventory indicator. The recurrent order system 123 may also provide functionality to facilitate the purchase of the item. The recurrent order system 123 may communicate with the marketplace system 120 (e.g., retrieving item images, item descriptions, item prices, and the like) and the payment system(s) 122 (e.g., performing the transaction for the purchase of the item). In an alternative embodiment, the recurrent order system 123 may be part of the marketplace system 120.

Further, while the client-server-based network architecture 100 shown in FIG. 1 employs a client-server architecture, the present inventive subject matter is of course not limited to such an architecture, and may equally well find application in a distributed, or peer-to-peer, architecture system, for example. The various marketplace, payment, and recurrent order systems 120, 122, and 123 may also be implemented as standalone software programs, which do not necessarily have networking capabilities.

The web client 106 accesses the various marketplace, payment, and recurrent order systems 120, 122, and 123 via the web interface supported by the web server 116. Similarly, the programmatic client 108 accesses the various services and functions provided by the marketplace, payment, and recurrent order systems 120, 122, and 123 via the programmatic interface provided by the API server 114. The programmatic client 108 may, for example, be a seller application (e.g., the Turbo Lister application developed by eBay® Inc., of San Jose, Calif.) to enable sellers to author and manage listings on the networked system 102 in an off-line manner, and to perform batch-mode communications between the programmatic client 108 and the networked system 102.

Additionally, a third party application(s) 128, executing on a third party server(s) 130, is shown as having programmatic access to the networked system 102 via the programmatic interface provided by the API server 114. For example, the third party application 128, utilizing information retrieved from the networked system 102, may support one or more features or functions on a website hosted by the third party. The third party website may, for example, provide one or more promotional, marketplace, or payment functions that are supported by the relevant applications of the networked system 102.

Figure 2:
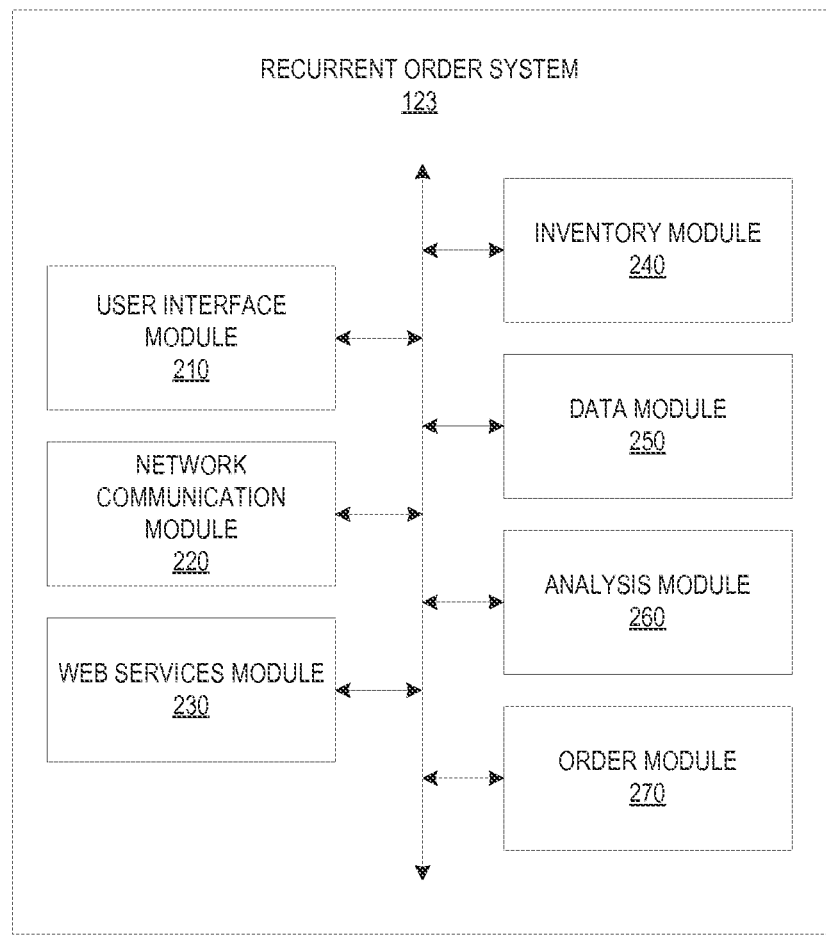
FIG. 2 is a block diagram illustrating a recurrent order system according to example embodiments.

FIG. 2 is a block diagram of the recurrent order system 123 that may provide a number of functions operable to determine order parameters for the purchase of the item, in response to receiving the inventory indictor (also referred to herein as inventory indication) and facilitate the purchase of the item. In an example embodiment, the recurrent order system 123 may include a user interface module 210, a network communication module 220, a web services module 230, an inventory module 240, a data module 250, an analysis module 260, and an order module 270. All of the modules may communicate with each other, for example, via a network coupling, shared memory, and the like. It will be appreciated that each module may be implemented as a single module, combined into other modules, or further subdivided into multiple modules. Other modules not pertinent to example embodiments may also be included, but are not shown.

The user interface module 210 may provide various user interface functionality operable to interactively present and receive information from the user 105. The user interface module 210 may be an optional module that may cause presentation of various information to the user by communicating information to a device operable to present information to the user. For example, the user interface module 210 may cause presentation of a user interface configured to receive the user criteria from the user, a user selection of a particular item from the user, and so on. The user interface module 210 may also cause presentation of various notifications to the user, such as the notification indicating the low inventory condition. Information may be presented using a variety of means including visually displaying information and using other device outputs (e.g., audio, tactile, and so forth). Similarly, information may be received by a variety of means including alphanumeric input or other device input (e.g., one or more touch screen, camera, tactile sensors, light sensors, infrared sensors, biometric sensors, microphone, gyroscope, accelerometer, other sensors, and so forth). It will be appreciated that the user interface module 210 may provide many other user interfaces to facilitate functionality described herein. Presenting is intended to include communicating information to a device (e.g., client devices 110 and 112) with functionality operable to perform presentation using the communicated information. Interactively presenting is intended to include the exchange of information from the presenting device, the user 105, and the recurrent order system 123.

The network communication module 220 may perform various network communication functions such as communicating with networked system 102, the database servers 124, and the third party servers 130. Network communication may operate over any wired or wireless means to provide communication functionality.

The web services module 230 may perform various web services functions such as retrieving information from third party servers 130 and application servers 118. Information retrieved by the web services module 230 may include data associated with the user 105 (e.g., user profile information from an online account, social networking data associated with the user 105, and so forth), data associated with an item (e.g., images of the item, reviews of the item, and so forth), and other data.

The inventory module 240 may perform various inventory functions associated with the item of the user. For example, the inventory module 240 may receive the inventory indicator, indicating the inventory level of the item that corresponds to the item of the user. Various other inventory related functions may be performed by the inventory module 240.

The data module 250 may perform various data functions to facilitate the functionality of the recurrent order system 123. For example, the data module 250 may access user data corresponding to the user. The user data may include a wide variety of data and may be accessed from many different sources include the third party servers 130, the data base servers 124, the marketplace system 120, the client devices 110 and 112, and so on.

The analysis module 260 may perform various analyses using a variety of data to facilitate the functionality of the recurrent order system 123. For example, the analysis module 260 may determine order parameters for the purchase of the item based on analysis of the user data and the inventory level. Many schemes and techniques may be employed by the analysis module 260 to determine the order parameters. Many other analyses may be performed by the analysis module 260.

The order module 270 may perform various transaction functions to facilitate the functionality of the recurrent order system 123. For example, the order module 270 may facilitate the purchase of the item using the order parameters. In some example embodiments, the order module 270 may automatically purchase the item using the order parameters. Many other order related functions may be performed by the order module 270. Each user has a variety of signals representing information about that user, wherein these signals may be used to enhance the recurrent order system. The recurrent order system 123 may adapt to the real-time behaviors and environment.

Figure 3A:
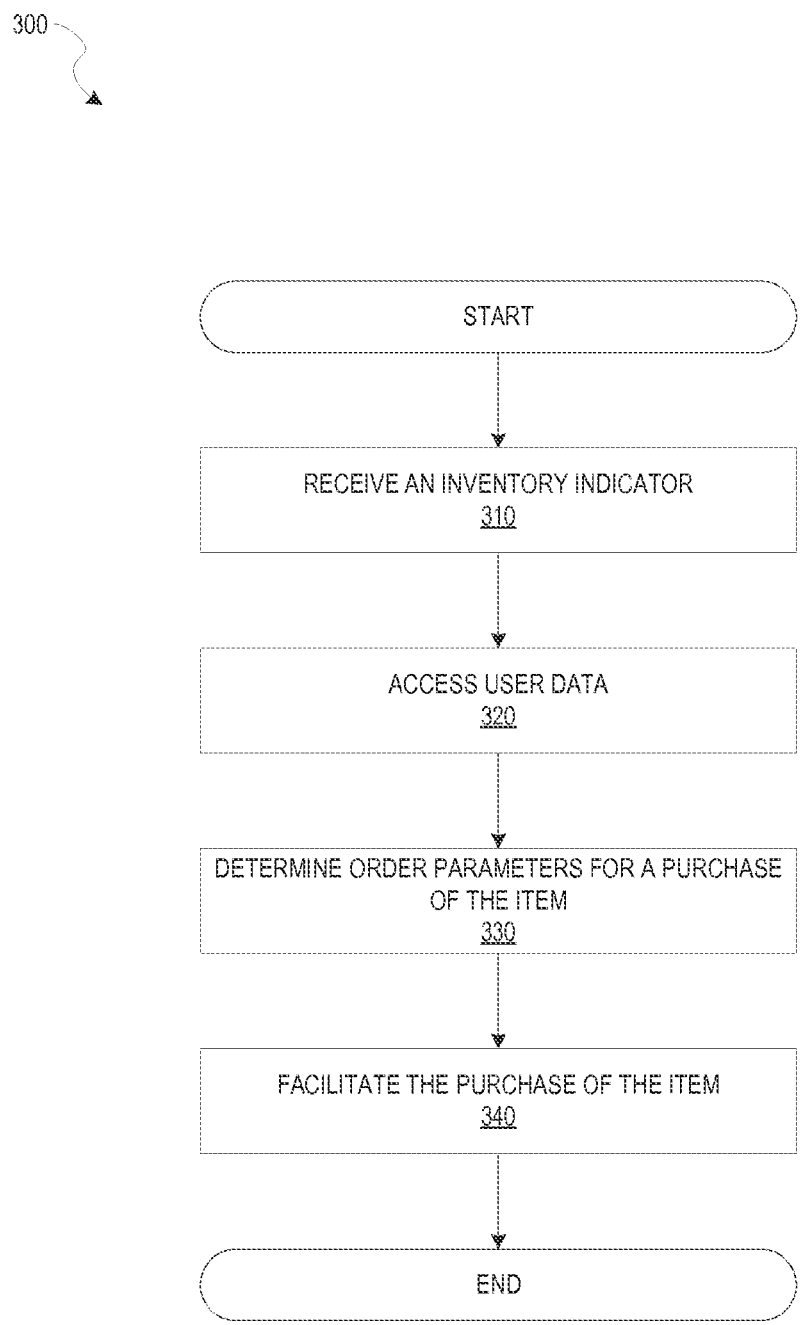
FIG. 3A is a flow diagram illustrating a method for determining order parameters for purchase of an item according to example embodiments.

FIG. 3A is a flow diagram illustrating an example method 300 for determining the order parameters for the purchase of the item. The various operations of the method 300 may be performed by the recurrent order system 123. At operation 310, the inventory module 240 may receive an inventory indicator. The inventory indicator may correspond to an inventory level of the item. In other words, the inventory indicator may indicate an inventory level of the item. For instance, the inventory level may be a count of a particular item, a usage remaining indicator (e.g., battery life left), a weight, a number of uses count (e.g., the number of times a faucet valve has opened), other usage indications (e.g., number of miles on a set of tires), and so on. The inventory indicator may be received from a variety of devices of the user (e.g., client devices 110 and 112).

In an example embodiment, the inventory indicator may be received from a smart device or other user device that includes a sensor to detect the inventory level of the item. For example, the inventory indicator may be received from a smart appliance in a smart home. The smart appliance may be a smart refrigerator that has sensors to detect the inventory level of the contents of the smart refrigerator. The smart refrigerator may communicate inventory data, including the inventory level, to the recurrent order system 123, received at the inventory module 240. The inventory data may include a variety of other information, such as brand of the item, usage information of the item, acquisition time of the item, and so on.

In some embodiments, one of the signals used by the recurrent order system 123 is purchase information for a user. For example, if the user has a product A scheduled for recurrent order, but needs to purchase product A while on vacation or otherwise, then this purchase will be input into the recurrent order system 123 and the schedule adjusted accordingly.

In some embodiments, signals provided to the recurrent order system 123 may be used to set an initial schedule for ordering a new product, as well as to adjust existing product order schedules. In this way, the user's information is used to predict a future behavior or product usage. Similarly, the recurrent order system 123 may also be used by the user to adjust their use of the product. In some examples, the recurrent order system 123 suggests another product, such as a complementary, alternate, or other product.

In other example embodiments, the inventory indicator may be received in response to inferring the inventory level of the item from the user data. For example, an estimated consumption rate may be determined based on the user data. For instance, the frequency of purchases for a particular item may be used to infer consumption rate. In this instance, the current inventory level of the item may be inferred based on an analysis of the estimated consumption rate of the item and a quantity of the item remaining (e.g., as determined from the last known purchase). Many schemes and techniques may be used to infer the inventory indicator from the user data.

In alternative example embodiments, the inventory indicator may be received in response to the user providing the inventory indicator via a user interface configured to receive the inventory indicator. For instance, the user may wish to reorder the item and may provide an indication of the inventory level of the item. In this instance, the inventory indicator, provided by the user, may be used to determine the order parameters. In another example embodiment, an estimated inventory level may be presented to the user and the user may provide corrections or adjustments to the estimated inventory level. The user may input this information via a mobile app on a mobile device, or through a PC, or any other way to provide the information to the recurrent order system 123 over a network, such as the Internet. The user may interact with the recurrent order system 123 through a portal or user interface on their device.

In an example embodiment, the user may specify the item. For example, the user may provide the item to a user interface configured to receive a user-specified item. For instance, a list of commonly reordered items (e.g., consumable goods such as diapers, coffee filters, and so forth) may be presented to the user. The user may make a selection from among the items included in the list. Many other schemes may be employed for the user to specify the item.

In another example embodiment, the analysis module 260 may identify the item by analyzing the user data to find a recurrently purchased item. For instance, the user may frequently purchase a particular item such as, diapers. In this instance, the purchase history of the user may indicate numerous purchases for diapers and the analysis module 260 may identify diapers as the item to determine the order parameters for ordering diapers.

In further example embodiments, the analysis module 260 may identify the item based on an analysis of the user data. In some examples, the analysis module 260 incorporates, or uses, information from social networks, or other networked connections, in evaluating an order schedule. For example, the user data may indicate that the user is having a child. This may be inferred, for example based on various purchases of the user (e.g., baby stroller purchase, baby clothing purchase, ultrasound payment, and so on), exercise habits of the user (e.g., as determined by a smart device of the user), and so on. Similarly, this may be indicated by posts on social networks, searches on shopping or interest sharing sites, or otherwise ascertained from signals within the user's domains. The item may be selected from a group of items associated with the inference. In this particular example, the group of items may include baby bottles, diapers, and the like. Many other inferences may be drawn from the user data and a variety of items may be determined based on the inferences.

In some example embodiments, the user interface module 210 may cause presentation of the inventory level to the user. For example, a meter depicting the current inventory level of the item may be communicated to a user device and displayed to the user. The inventory level may be presented to the user in a variety of manners and the above is merely a non-limiting example.

Referring back to FIG. 3A, at operation 320, the data module 250 may access user data that corresponds to the user. The user data may include a purchase history of the user, a browse history of the user, sensor data of the user (e.g., data from smart appliances), a user profile of the user (e.g., a profile including user demographic data), social networking posts of the user, and so forth. The user data may be accessed from a variety of sources including the third party servers 130, the client devices 110 and 112, the marketplace system 120, and other sources.

At operation 330, the analysis module 260 may determine the order parameters for a purchase of the item based on an analysis of the user data and the inventory level. In some example embodiments, other data may be used in the analysis to determine order parameters (e.g., merchant discount information for a particular item may be retrieved from the marketplace system(s) 120). The order parameters may anticipate the user's future usage of the item. For example, trends in the user's purchase history may indicate a change in the rate of consumption for a particular item and the order parameters may be determined in accordance with the trend. The order parameters may include a quantity, a delivery time, a delivery method, a delivery destination, a merchant, a product, and so on. A variety of schemes and techniques may be employed to determine the order parameters. Additionally, where one item is out of stock and not available for delivery according to the schedule or the adjusted schedule, the system may determine an alternate process, such as to suggest a similar product, or to identify an alternate merchant or delivery option. In one example, the user has selected alternative products that are acceptable to replace the current product on the ordering schedule.

In another example embodiment, the analysis module 260 may identify an order schedule for the item. For instance, the item may be a subscription of the user that includes order schedule for the item. The analysis module 260 may determine an adjustment to the order schedule based on the inventory indicator. For example, the timing of the orders may be adjusted to ensure the user maintains a supply of the item above a threshold. The analysis module 260 may determine the adjustment to the order schedule by comparing the inventory indicator to the order schedule and identifying a mismatch. For example, the inventory indicator may indicate a particular inventory level below a threshold and the order schedule may indicate that the next order will not arrive in time to prevent depletion of the supply of the item. Based on the mismatch between the order schedule and the inventory indicator, the analysis module 260 may adjust the order schedule. The order module 270 may facilitate the adjustment to the order schedule for the item. For example, the order schedule may be maintained by the marketplace system 120, the third party servers 130, and elsewhere. The order module 270 may communicate adjustments to the order schedule to adjust the order schedule.

In some embodiments, a network of users that are ordering a same product, or similar products, may be notified of an out-of-stock condition for a first user enabling the other users to trade their order times with the first user, so as to avoid any out-of-stock experiences for users. In this way, the networked users' schedules are managed to achieve optimum product delivery conditions over the set of networked users.

In an example embodiment, the analysis module 260 may determine that the user has changed or will change their rate of consumption for the item. For example, the user may be on vacation and may need less bottled water at the user's home while on vacation. The analysis module 260 may determine the user is on vacation, for example, by analyzing the user's location (as determined by a GPS component of a mobile device, for example). For instance, if the user's location is substantially further away from the user's home than an average distance the user is from their home (e.g., as determined by past locations of the user included in the user data) then the analysis module 260 may infer that the user is on vacation. In another instance, the analysis module 260 may determine the user is on vacation, and for how long, by analyzing the purchase history of the user (e.g., purchased round trip airline ticket to a destination). Based on the inference that the user is on vacation, it may further be inferred that the rate of consumption of bottle water at the home may decrease. The analysis module 260 may then determine various order parameters to suite the new rate of consumption. For example, the analysis module 260 may then reduce the quantity of bottle water purchased or adjust order and delivery times of the purchase of the item. Many schemes and techniques using a variety of data corresponding to the user may be employed to determine the order parameters.

In another example embodiment, the analysis module 260 may determine the delivery time may to avoid depletion of the supply of the item. For instance, the analysis module 260 may determine based on the inventory level and an inferred rate of consumption for the item (inferred from the user data) that supply of the item may be depleted at a depletion time. To avoid depletion of the supply of the item, the analysis module 260 may determine the delivery time to be before the depletion time. Further, the delivery method may be determined such that the delivery time may be met (e.g., if the determined delivery time is within 24 hours, a next day delivery option may be used). Many schemes and techniques may be employed to determine the delivery time to avoid depletion of the supply of the item.

In still another example embodiment, the analysis module 260 may determine the order time based on an analysis of merchant discounts for the item. For instance, the data module 250 may retrieve or access the other data that may include merchant discount information. In this instance, if the analysis module 260 determines that the item is on sale or otherwise discounted by analyzing the merchant discount information, the order time may be determined to be a time when the discount would apply to the order. The price comparison among merchants may consider a single product, or a combination of products.

In yet another example embodiment, the analysis module 260 may determine the order parameters to minimize average cost of the item. Many factors may be used to minimize average cost of the item. For instance, the quantity ordered may be a factor used to minimize average cost. Purchasing the item at a particular quantity may reduce average cost of the item. The order quantity may be bounded by a maximum quantity that may be determined based on the purchase history of the user or the purchase history of other users. Other factors such as brand, merchant, order time (as discussed above), and so on may be employed to minimize average cost for the purchase of the item. In this way, the system may suggest a different purchase scheme, where possible, to achieve a goal(s) consistent with the user's profile.

In other example embodiment, the analysis module 260 may determine the delivery location to be convenient for the user. For example, the analysis module 260 may determine that the user may frequently spend summers at a location other than the user's home. The location of the delivery may be determined so that the supply of the item is maintained for the user at both locations and the delivery location determined based on location information included in the user data, for example.

In further example embodiments, the analysis module 260 may analyze the user data of the plurality of other users to determine the order parameters. Various collaborative filtering techniques may be employed to determine the order parameters based on the user data of the plurality of other users. For example, the data module 250 may access the user data of the plurality of other users. In this example, the analysis module 260 may identify other users among the plurality of other users that are similar to the user (e.g., comparing demographic data between users, comparing purchase histories between users, and so on). The purchase histories, sensor data (e.g., inventory indications received from smart appliances) of identified other users may be used to determine the order parameters such as the quantity (e.g., determining quantity to order for the user based on the inferred consumption rate of the identified similar other users). Many other order parameters may be determined by analyzing a variety of data from the user data of the plurality of other users.

In still a further example embodiment, the analysis module 260 may determine the order parameters based on the user criteria. The analysis module 260 may receive the user criteria from the user (e.g., the user may provide the user criteria to a user interface configured to receive the user criteria). The user criteria may specify rules for the order parameters. In an example embodiment, the user criteria may include a cost criterion that limits the cost of the purchase to a user specified cost. In other example embodiments, the user criteria may include particular brands to purchase, particular merchants to purchase from, and so on. Many other user-specified criterion may be included in the user criteria that specify various rules for determining the order parameters.

Referring back to FIG. 3A, at operation 340, the order module may facilitate the purchase of the item using the order parameters. The purchase of the item may be facilitated in a variety of ways, such as recommending the purchase to the user (as described below in FIG. 4) and automatically purchasing the item (as described below in FIG. 5).

Figure 3B:
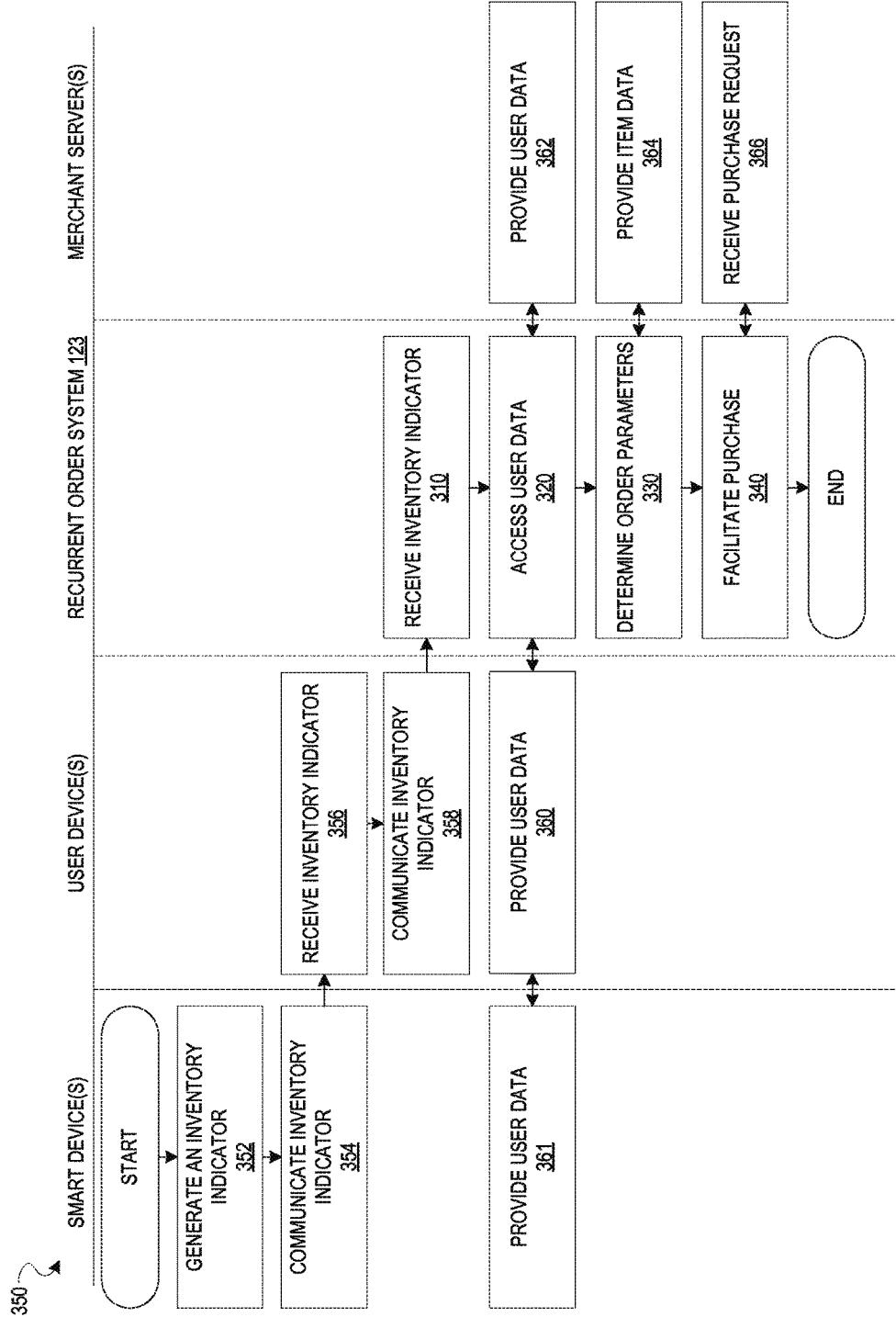
FIG. 3B is a flow diagram illustrating communication between various devices to perform a method for determining order parameters for purchase of an item according to example embodiments.

FIG. 3B is a flow diagram illustrating a method 350 for determining order parameters for purchase of the item according to example embodiments. The method 350 is merely a non-limiting example of communication between various devices and many other schemes may be employed. At the operation 352, smart devices (e.g., a smart refrigerator, smart batteries, and the like), may generate an inventory indicator. For instance, a smart refrigerator may generate an inventory indicator indicating the inventory level of a particular item inside the smart refrigerator.

At operation 354, the smart device may communicate the inventory indicator to the user device. In other example embodiments, the smart device may communicate the inventory indicator to the recurrent order system 123 or both the user device and the recurrent order system 123.

At operation 356, the user device may receive the inventory indicator. The user device may be, for example, a mobile device of the user (e.g., a smart phone running a mobile operating system).

At operation 358, the user device may communicate the inventory indicator to the recurrent order system 123. In other example embodiments, the user device may generate the inventory indicator and communicate the inventory indicator to the recurrent order system 123.

As described above, the recurrent order system may receive the inventory indicator at the operation 310.

Subsequent to receiving the inventory indicator, the recurrent order system 123 may access user data. For example, the user data may be accessed from the user device at operator 360, the smart device at operation 361, merchant server(s) at the operation 362, the marketplace system 120, the databases 126, and other sources. For instance, the merchant servers (e.g., the third party servers 130) may provide purchase history information, user profile information, and a variety of other information. The user device may similarly provide information associated with the user, such as, location information, user profile information, and so on. The smart device may provide inventory information and other information.

At the operation 330, the recurrent order system may determine the order parameters, as described above. In an example embodiment, the recurrent order system 123 may request various information from the merchant servers. For example, at the operation 364, the merchant servers may provide item data such as availability information associated with the item, item descriptions, pricing information associated with the item, discount information, other item data, and so forth. The recurrent order system 123 may determine the order parameters using the user information and information retrieved from the merchant servers or other sources.

At the operation 340, the recurrent order system 123 may facilitate purchase of the item. For example, the recurrent order system 123 may request purchase of the item, on behalf of the user, from the merchant servers.

In an example embodiment, at operation 366, the merchant servers may receive the purchase request from the recurrent order system 123. The merchant servers may perform the transaction for the item using the order parameters included in request for purchase of the item.

Figure 4:
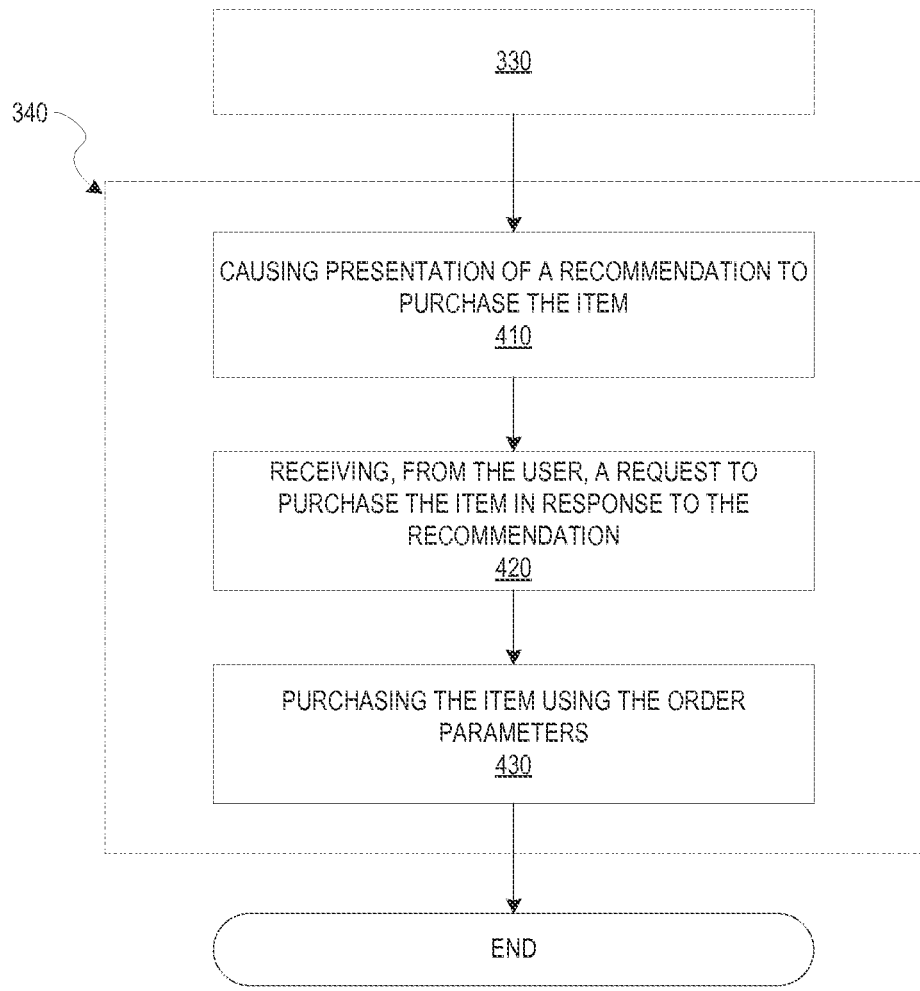
FIG. 4 is a flow diagram illustrating a method for facilitating the purchase of the item according to example embodiments.

FIG. 4 is a flow diagram illustrating an example embodiment for facilitating the purchase of the item (the operation 340). In further example embodiments, the operation 340 may include recommending the purchase to the user. At operation 410, the user interface module 210 may cause presentation of the recommendation to purchase the item using the order parameters. The recommendation to purchase the item using the order parameters may be presented in a variety of ways. In some embodiments, the presentation is a notification on a mobile device, or may be through a software application running on a user device, which may be interactive enabling the user to select from the notification or user interface directly. In some embodiments, a recommendation is made, and the user must either confirm, reject, or suggest another alternative.

At operation 420, the order module 270 may receive, from the user, the request to purchase the item in response to the recommendation to purchase the item. For example, the recommendation to purchase the item may be presented to the user with a user interface element that when activated by the user sends the request to purchase the item using the order parameters. In further example embodiments, the user may modify the order parameters prior to sending the request to purchase the item.

At operation 430, the order module 270 may purchase the item using the order parameters. In an example embodiment, the order module 270 may communicate with the marketplace system(s) 120 and payment system(s) 122 to perform the purchasing of the item.

Figure 5:
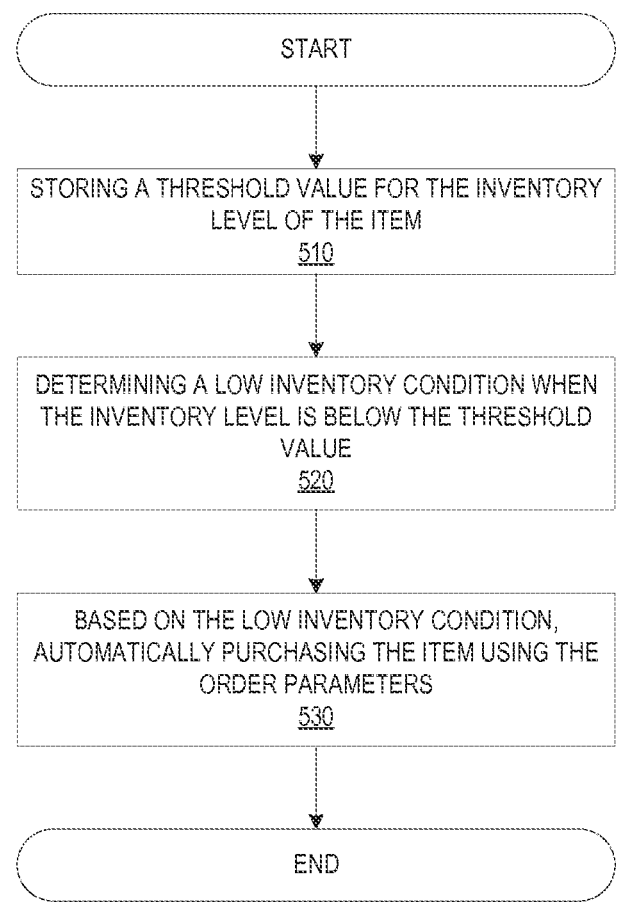
FIG. 5 is a flow diagram illustrating a method for automatically purchasing an item according to example embodiments.

FIG. 5 is a flow diagram illustrating an example method for automatically purchasing an item using the order parameters. At operation 510, the analysis module 260 may store a threshold value for the inventory level of the item. For example, the threshold may be stored in database(s) 126. The threshold value may be a provided by the user or automatically determined. For example, the threshold may be automatically determined based on the user data. The analysis module 260 may determine the threshold by analyzing the user data. An estimated rate of consumption, average delivery lead time may be computed (e.g., based on orders from the same merchant using the same delivery method), and other information may be used to determine a threshold that would allow for enough time to replenish the supply of the item without depleting the supply of the item.

At operation 520, the analysis module 260 may determine a low inventory condition when the inventory level is below the threshold value. In some example embodiments, a notification may be provided to the user (as depicted in FIG. 6).

At operation 530, the order module 270 may automatically purchase the item using the order parameters based on the low inventory condition. The purpose of the automatic purchasing is to alleviate the burden of replenishing supplies of consumable items by the user.

Figure 6:
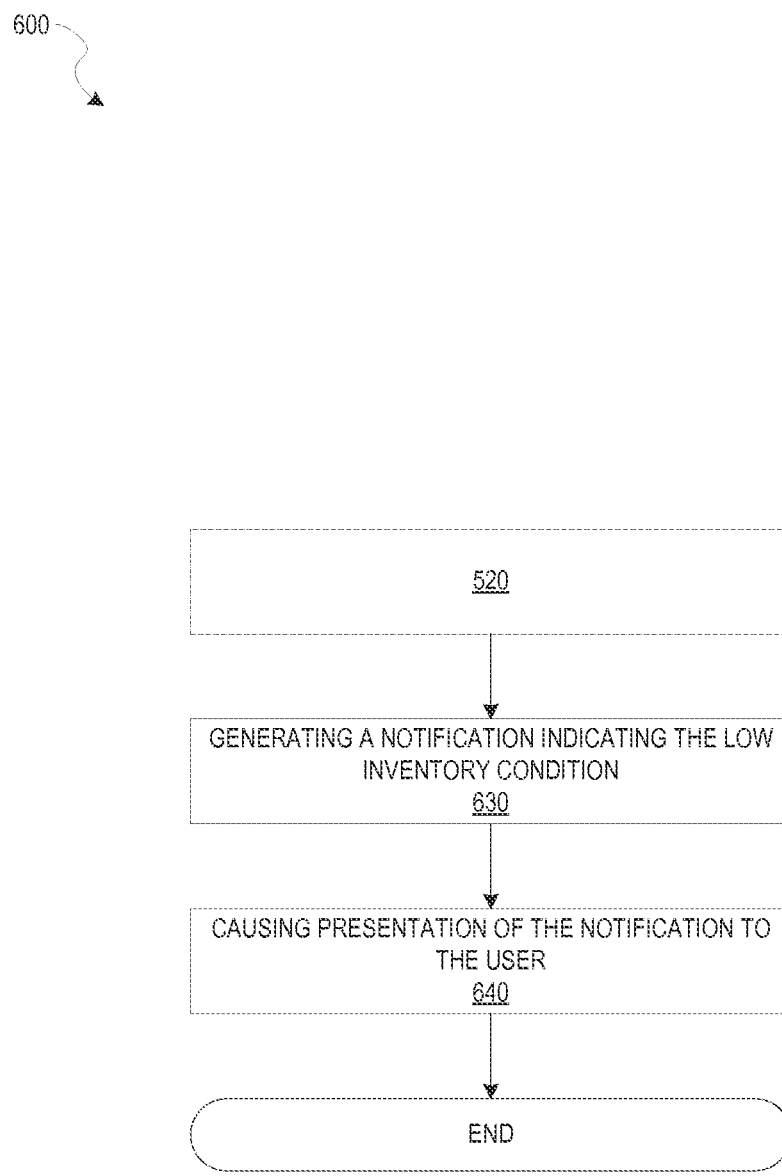
FIG. 6 is a flow diagram illustrating a method for notification of the user of a low inventory condition according to example embodiments.

FIG. 6 is a flow diagram illustrating notifying the user of the low inventory condition. In further example embodiments, subsequent to the low inventory condition being determined at the operation 520, at operation 630 the analysis module 260 may generate a notification indication the low inventory condition. At operation 640, the user interface module 210 may cause presentation of the notification to the user. In further example embodiments, the user may be provided an option to cancel the automatic purchase of the item using the order parameters. In alternative example embodiments, there may be no automatic purchase of the item and the user may provide the request to purchase the item using the order parameters. In this example embodiment, the notification may provide the user the option to request the purchase of the item using the order parameters (as illustrated in FIG. 9).

Figure 7:
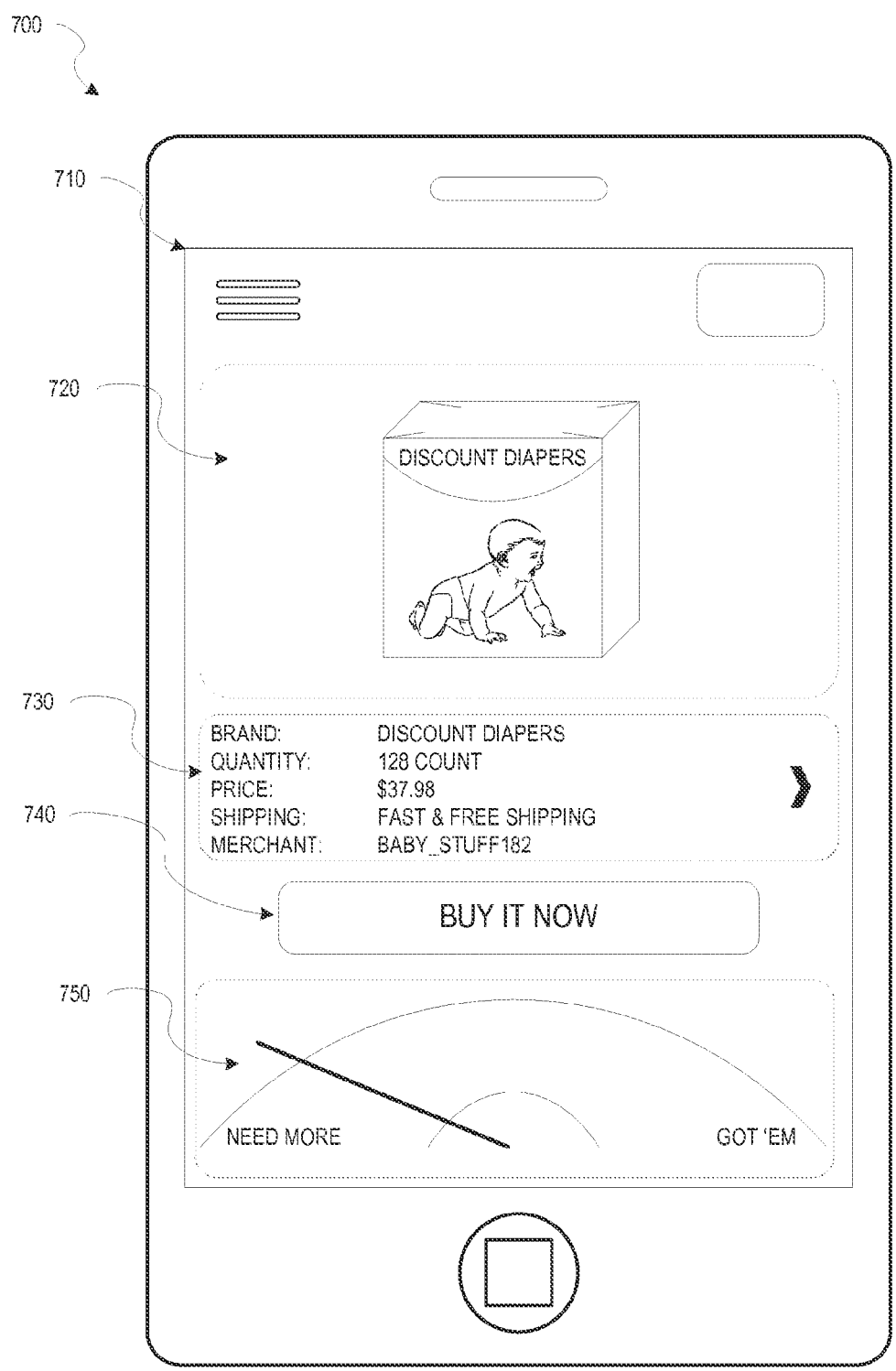
FIG. 7 illustrates a user interface for presenting order parameters according to example embodiments.

FIG. 7 depicts an example user interface for presenting order parameters. The example user device 700 may include a display 710 operable to present interactive user interfaces to the user. The display 710 may be displaying an example user interface for presenting order parameters to the user. User interface element 720 may be an image of the item, although a variety of other item information may be presented. User interface element 730 may be a textual display of the order parameters. Activating the user interface element 730 may provide the user with additional order parameters. User interface element 740 may be a button that when activated may purchase the item using the order parameters. The user interface element 750 may be an image or animation that represents the current inventory level of the item. In this example, the user interface element 750 may be a meter that illustrates the inventory level of the item. Many other varieties of images and other forms of presentation may be employed to present the inventory level to the user.

Figure 8:
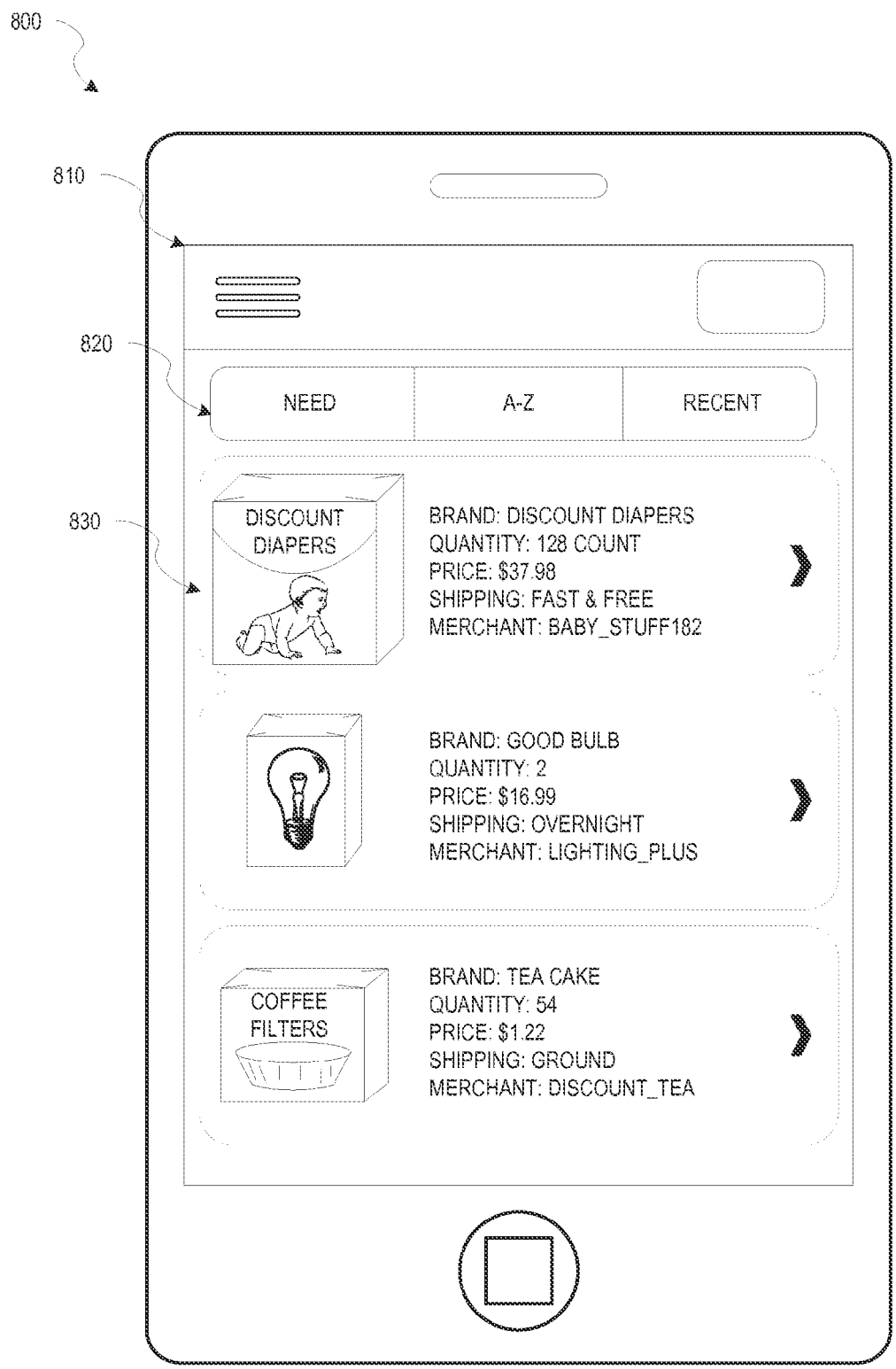
FIG. 8 illustrates a user interface for presenting items to be reordered according to example embodiments.

FIG. 8 depicts an example user interface for presenting items to be reordered. The example user device 800 may include a display 810 operable to present interactive user interfaces to the user. The display 810 may be displaying an example user interface for presenting items to be reordered to the user. User interface element 820 may sort the items in the list by various metrics. For instance, the items may be sorted based on how urgent the need for the item is (e.g., the user is about to run out of a particular item and it needs to ordered soon), alphabetical, recently purchased, and so on. User interface element 830 may provide information (e.g., image, brand, and so forth) about the item and the order parameters. Activating the user interface element 830 may provide additional information about the item or additional order parameters. Many varieties of user interfaces may be employed to present items to be ordered to the user.

Figure 9:
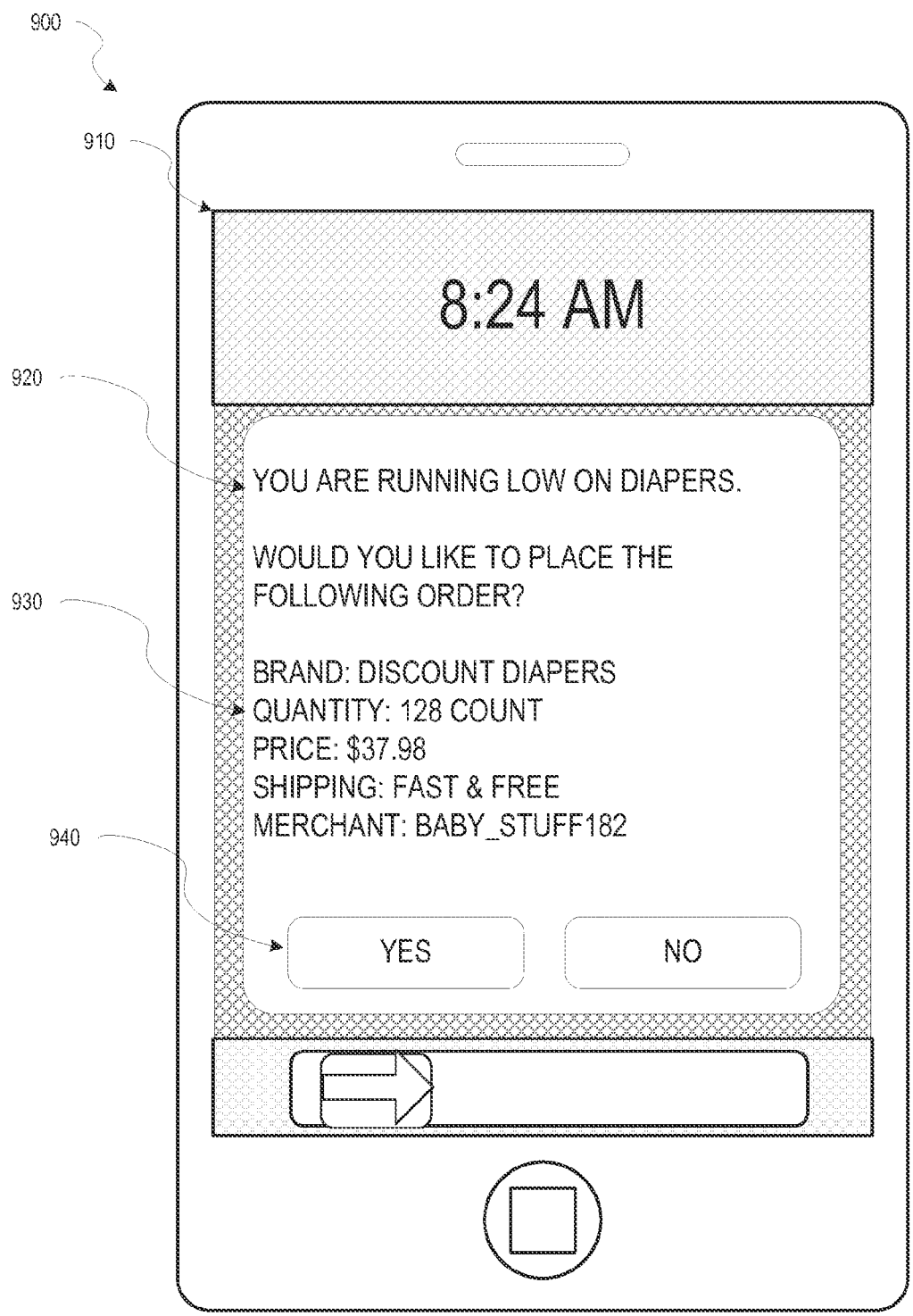
FIG. 9 illustrates an example user interface for presenting a notification to the user.

FIG. 9 depicts an example user interface for presenting a notification to the user. The example user device 900 may include a display 910 operable to present interactive user interfaces to the user. The display 910 may be displaying an example user interface for presenting a notification to the user. User interface element 920 may be a notification that may include the inventory level, a variety of item information, the order parameters 930, and a user interface element 940 to provide an option to purchase the item using the order parameters. Activating the user interface element 940 may request purchase of the item using the displayed ordered parameters. Many other user interfaces designs, styles, and presentation forms may be employed to present a notification to the user. Alternate presentations of the displays of FIGS. 8-9 may include additional information, graphics, options and so forth; other presentations may include less information, or may provide abridged information for easy use by the user. In some embodiments, the notifications are text messages, or SMS messages, which are provided to notify the user of a delivery, up-coming date or other information. Some text messages may be interactive, enabling the user to make a selection through the SMS system, mobile application, or other method.

Modules, Components, and Logic

Figure 10:
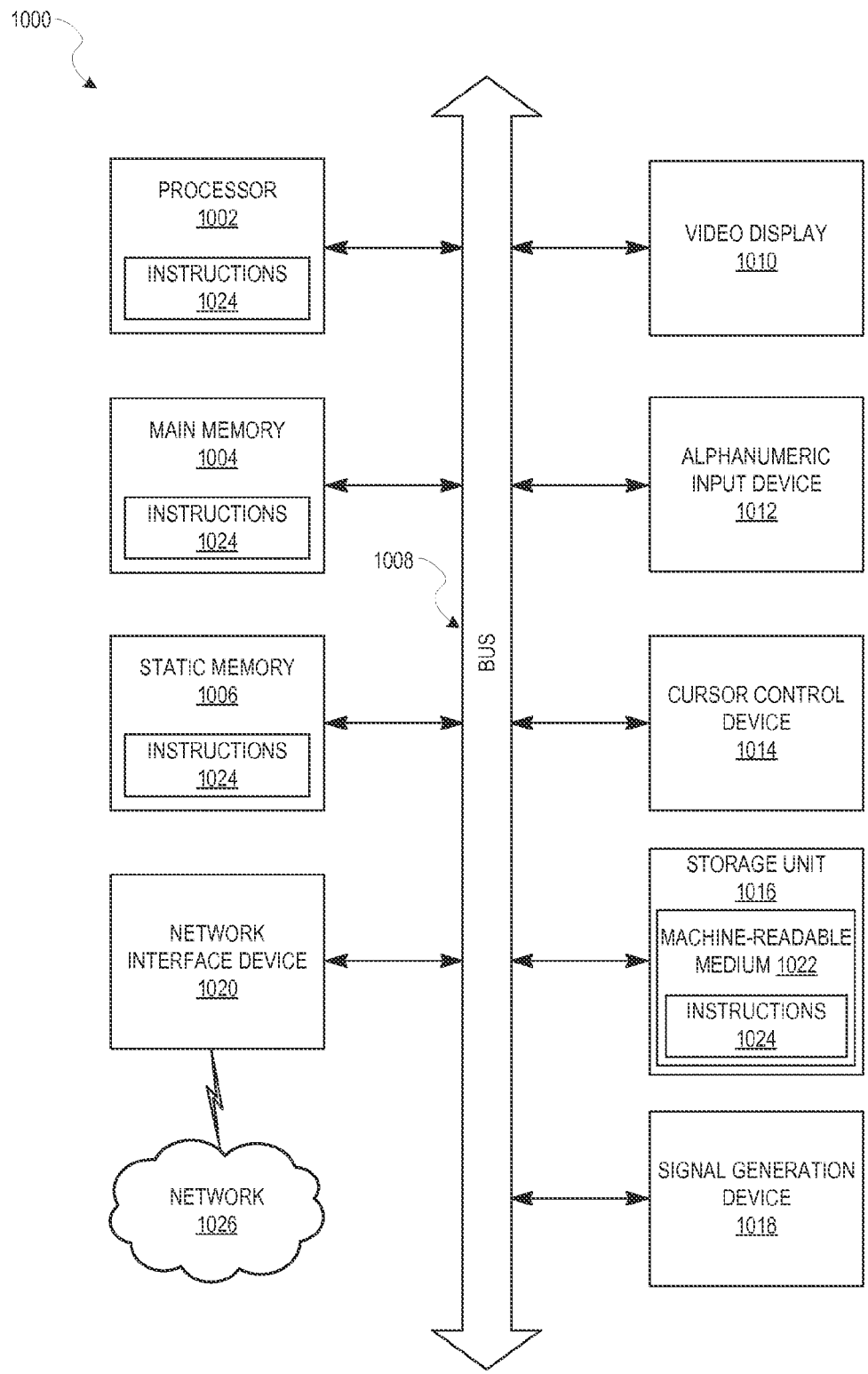
FIG. 10 illustrates a diagrammatic representation of a machine in the form of a computer system within which a set of instructions, for causing the machine to perform any one or more of the methodologies discussed herein, may be executed, according to an example embodiment.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1024 (e.g., software, a program, an application, an applet, an app, or other executable code) for causing the machine 1000 to perform any one or more of the methodologies discussed herein may be executed. In alternative embodiments, the machine 1000 operates as a standalone device or may be connected (e.g., networked) to other machines. In a networked deployment, the machine 1000 may operate in the capacity of a server machine or a client machine in a server-client network environment, or as a peer machine in a peer-to-peer (or distributed) network environment. The machine 1000 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1024, sequentially or otherwise, that specify actions to be taken by that machine. Further, while only a single machine 1000 is illustrated, the term "machine" shall also be taken to include a collection of machines 1000 that individually or jointly execute the instructions 1024 to perform any one or more of the methodologies discussed herein.

The machine 1000 includes a processor 1002 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1004, and a static memory 1006, which are configured to communicate with each other via a bus 1008. The machine 1000 may further include a video display 1010 (e.g., a plasma display panel (PDP), a light emitting diode (LED) display, a liquid crystal display (LCD), a projector, or a cathode ray tube (CRT)). The machine 1000 may also include an alphanumeric input device 1012 (e.g., a keyboard), a cursor control device 1014 (e.g., a mouse, a touchpad, a trackball, a joystick, a motion sensor, or other pointing instrument), a storage unit 1016, a signal generation device 1018 (e.g., a speaker), and a network interface device 1020.

The storage unit 1016 includes a machine-readable medium 1022 on which is stored the instructions 1024 embodying any one or more of the methodologies or functions described herein. The instructions 1024 may also reside, completely or at least partially, within the main memory 1004, within the static memory 1006, within the processor 1002 (e.g., within the processor's cache memory), or both, during execution thereof by the machine 1000. Accordingly, the main memory 1004, static memory 1006 and the processor 1002 may be considered as machine-readable media 1022. The instructions 1024 may be transmitted or received over a network 1026 via the network interface device 1020.

As used herein, the term "memory" refers to a machine-readable medium 1022 able to store data temporarily or permanently and may be taken to include, but not be limited to, random-access memory (RAM), read-only memory (ROM), buffer memory, flash memory, and cache memory. While the machine-readable medium 1022 is shown in an example embodiment to be a single medium, the term "machine-readable medium" should be taken to include a single medium or multiple media (e.g., a centralized or distributed database, or associated caches and servers) able to store instructions 1024. The term "machine-readable medium" shall also be taken to include any medium, or combination of multiple media, that is capable of storing instructions (e.g., instruction 1024) for execution by a machine (e.g., machine 1000), such that the instructions, when executed by one or more processors of the machine 1000 (e.g., processor 1002), cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof. The term "machine-readable medium" specifically excludes non-statutory signals per se.

Some embodiments will incorporate a system of connected devices including a central server, such as in a cloud computing network, and distributed user devices, such as mobile phones and/or smart devices. The smart devices may communicate with the user's local device or also with the central server. The central server may be a distributed network of computing devices. The user's local device may be a user communication device or may be a smart router or other wireless communication device, having capability for smart actions based on signals received from the smart devices or other user communication device. For example, the router may be programmed to forward requests to a central server on receipt of specific information from a smart device. In this way, the smart home having smart devices may operate autonomously. In one example, a smart device in a refrigerator identifies a change in usage pattern of milk, and sends a signal to the router; in response the router reacts to this information and sends a message to the central server; the system then initiates an action based on the information received. The system may initiate an action based on the sequence of events, such as where the information received from the router identifies the history of the information.

Furthermore, the machine-readable medium 1022 is non-transitory in that it does not embody a propagating signal. However, labeling the machine-readable medium 1022 as "non-transitory" should not be construed to mean that the medium is incapable of movement; the medium should be considered as being transportable from one physical location to another. Additionally, since the machine-readable medium 1022 is tangible, the medium may be considered to be a machine-readable device.

The instructions 1024 may further be transmitted or received over a communications network 1026 using a transmission medium via the network interface device 1020 and utilizing any one of a number of well-known transfer protocols (e.g., hypertext transfer protocol (HTTP)). Examples of communication networks include a local area network (LAN), a wide area network (WAN), the Internet, mobile telephone networks (e.g. 3GPP, 4G LTE, 3GPP2, GSM, UMTS/HSPA, WiMAX, and others defined by various standard setting organizations), plain old telephone service (POTS) networks, and wireless data networks (e.g., WiFi and BlueTooth networks). The term "transmission medium" shall be taken to include any intangible medium that is capable of storing, encoding, or carrying instructions 1024 for execution by the machine 1000, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium 1022 or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor 1002, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 1002 that are temporarily configured (e.g., by software) or permanently configured to perform the relevant operations. Whether temporarily or permanently configured, such processors 1002 may constitute processor-implemented modules that operate to perform one or more operations or functions described herein. As used herein, "processor-implemented module" refers to a hardware module implemented using one or more processors 1002.

Similarly, the methods described herein may be at least partially processor-implemented, with a processor 1002 being an example of hardware. For example, at least some of the operations of a method may be performed by one or more processors 1002 or processor-implemented modules. Moreover, the one or more processors 1002 may also operate to support performance of the relevant operations in a "cloud computing" environment or as a "software as a service" (SaaS). For example, at least some of the operations may be performed by a group of computers (as examples of machines 1000 including processors 1002), with these operations being accessible via a network 1026 (e.g., the Internet) and via one or more appropriate interfaces (e.g., an application program interface (API)).

The performance of certain of the operations may be distributed among the one or more processors 1002, not only residing within a single machine 1000, but deployed across a number of machines 1000. In some example embodiments, the one or more processors 1002 or processor-implemented modules may be located in a single geographic location (e.g., within a home environment, an office environment, or a server farm). In other example embodiments, the one or more processors 1002 or processor-implemented modules may be distributed across a number of geographic locations.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
   a processor; and
   a memory including instructions, which when executed by the processor, cause the processor to perform operations comprising:
   receiving an inventory indicator from a sensor on a user device and a current location of a user from positioning system in a mobile device, the inventory indicator corresponding to an inventory level of a first item;
   identifying an order schedule for the first item;
   determining a consumption rate of the first item based on the order schedule for the first item;
   determining a change in the consumption rate of the first item based on the current location of the user;
   determining an adjustment to the order schedule based on the inventory indicator and the change in the consumption rate; and
   facilitating the adjustment to the order schedule for the first item, facilitating the adjustment includes:
   causing display of a user interface on a computing device that includes recommendation of a purchase of the first item based on the adjustment to the order schedule, wherein the recommendation of the purchase of the first item is a selectable item on the user interface,
   receiving a selection signal from the computing device that is associated with an activation of the selectable item on the user interface, and
   when the selection signal is received, signaling to an external server to cause a purchase of the first item based on the adjustment to the order schedule.

2. The system of claim 1, wherein the instructions cause the processor to perform operations comprising:
   accessing user data corresponding to a user profile for a user;
   determining at least one order parameter for a purchase of the first item based on analysis of the user data and the inventory level, the at least one order parameter being predictive of the user's future usage of the first item; and
   signaling to the external server to cause the purchase of the first item using the at least one order parameter.

3. The system of claim 2, wherein the instructions cause the processor to perform operations comprising:
   storing an inventory level threshold of the first item;
   determining the change in the consumption rate of the first item based on the inventory level threshold of the first item;
   determining a low inventory condition when the inventory level is below the inventory level threshold; and
   signaling to the external server to cause the purchase of the first item using the at least one order parameter based on the low inventory condition.

4. A method comprising:
   receiving, by a processor, an inventory indicator from a user device and a current location of a user from a positioning system of a mobile device, the inventory indicator corresponding to an inventory level of a first item;
   identifying an order schedule for the first item;
   determining a consumption rate of the first item based on the order schedule for the first item;
   determining a change in the consumption rate of the first item based on the current location of the user;

determining an adjustment to the order schedule based on the inventory indicator and the change in the consumption rate; and facilitating the adjustment to the order schedule for the first item, facilitating the adjustment includes:

causing display of a user interface on a computing device that includes recommendation of a purchase of the first item based on the adjustment to the order schedule, wherein the recommendation of the purchase of the first item is a selectable item on the user interface, receiving a selection signal from the computing device that is associated with an activation of the selectable item on the user interface, and when the selection signal is received, signaling to an external server to cause a purchase of the first item based on the adjustment to the order schedule.

5. The method of claim 4, further comprising:
comparing the inventory indicator to the order schedule and identifying a mismatch; and
based on the mismatch, adjusting the order schedule based on the comparison.

6. The method of claim 4, further comprising:
accessing user data corresponding to a user profile for a user;
determining at least one order parameter for a purchase of the first item based on analysis of the user data and the inventory level, the at least one order parameter being predictive of the user's future usage of the first item; and
signaling to the external server to cause the purchase of the first item using the at least one order parameter.

7. The method of claim 6, further comprising:
storing an inventory level threshold of the first item;
determining the change in the consumption rate of the first item based on the inventory level threshold of the first item;
determining a low inventory condition when the inventory level is below the inventory level threshold; and
signaling to the external server to cause the purchase of the first item using the at least one order parameter based on the low inventory condition.

8. The method of claim 6, further comprising:
generating a notification indicating the low inventory condition; the notification including an option to cancel an automatic purchase of the first item using the at least one order parameter; and
causing presentation of the notification to the user;
receiving a user selection of the option to cancel the automatic purchase; and
canceling the automatic purchase in response to receiving the user selection of the option to cancel the automatic purchase.

9. The method of claim 6, further comprising:
causing presentation of a recommendation to purchase the first item using the at least one order parameter to the user;
receiving, from the user, a request to purchase the first item in response to the recommendation; and
purchasing the first item using the at least one order parameter.

10. The method of claim 6, wherein the user data includes a purchase history of the user, a browse history of the user, sensor data of the user, or a user profile of the user.

11. The method of claim 6, wherein the user data includes a purchase history of the user, a browse history of the user; sensor data of the user, or a user profile of the user.

12. The method of claim 6, further comprising:
identifying a recurrently purchased item from the user data, the first item being the identified recurrently purchased item.

13. The method of claim 6, wherein the at least one order parameter include a quantity, a delivery time, a delivery method, a delivery destination, a merchant, or a product.

14. A non-transitory machine-readable medium that stores instructions that, when executed by a processor, cause the processor to perform operations comprising:
receiving an inventory indicator from a sensor on a user device and a current location of a user from positioning system in a mobile device, the inventory indicator corresponding to an inventory level of a first item;
identifying an order schedule for a first item;
determining a consumption rate of the first item based on the order schedule for the first item;
determining a change in the consumption rate of the first item based on the current location of the user;
determining an adjustment to the order schedule based on the inventory indicator and the change in the consumption rate; and
facilitating the adjustment to the order schedule for the first item, facilitating the adjustment includes:
causing display of a user interface on a computing device that includes recommendation of a purchase of the first item based on the adjustment to the order schedule, wherein the recommendation of the purchase of the first item is a selectable item on the user interface,
receiving a selection signal from the computing device that is associated with an activation of the selectable item on the user interface, and
when the selection signal is received, signaling to an external server to cause a purchase of the first item based on the adjustment to the order schedule.

15. The non-transitory machine-readable medium of claim 14, wherein the instructions cause the processor to perform operations further comprising:
accessing user data corresponding to a user profile for a user;
determining at least one order parameter for a purchase of the first item based on analysis of the user data and the inventory level, the at least one order parameter being predictive of the user's future usage of the first item; and
signaling to the external server to cause the purchase of the first item using the at least one order parameter.

16. The non-transitory machine-readable medium of claim 14, wherein the instructions cause the processor to perform operations further comprising:
storing an inventory level threshold of the first item;
determining the change in the consumption rate of the first item based on the inventory level threshold of the first item;
determining a low inventory condition when the inventory level is below the inventory level threshold; and
signaling to the external server to cause the purchase of the first item using the at least one order parameter based on the low inventory condition.

* * * * *

UNITED STATES PATENT AND TRADEMARK OFFICE
CERTIFICATE OF CORRECTION

PATENT NO. : 10,438,276 B2
APPLICATION NO. : 14/254240
DATED : October 8, 2019
INVENTOR(S) : Sandra Lynn Godsey et al.

Page 1 of 1

It is certified that error appears in the above-identified patent and that said Letters Patent is hereby corrected as shown below:

In the Claims

In Column 19, Line 45, in Claim 8, delete "condition;" and insert -- condition, --, therefor.

In Column 19, Lines 62-64, in Claim 10, delete "wherein the user data includes a purchase history of the user, a browse history of the user, sensor data of the user, or a user profile of the user." and insert -- further comprising: receiving, from the user, user criteria specifying rules for determining the at least one order parameter, the determining at least one order parameter including using the user criteria. --, therefor.

In Column 20, Line 2, in Claim 11, delete "user;" and insert -- user, --, therefor.

Signed and Sealed this
Twenty-first Day of July, 2020

Andrei Iancu
*Director of the United States Patent and Trademark Office*